(12) United States Patent
Gurevich et al.

(10) Patent No.: US 7,220,463 B2
(45) Date of Patent: May 22, 2007

(54) METHOD FOR OBTAINING NANOPARTICLES

(76) Inventors: Sergey A. Gurevich, Pr. Prosvescheniya 68/1-133, St. Petersburg (RU) 195276; Vladimir M. Kozhevin, V.O. Bolshoi Pr. 82-32, St. Petersburg (RU) 199026; Denis A. Yavsin, Ul. Syezzhinskaya 37-14, St. Petersburg (RU) 197198

( * ) Notice: Subject to any disclaimer, the term of this patent is extended or adjusted under 35 U.S.C. 154(b) by 0 days.

(21) Appl. No.: 11/366,885

(22) Filed: Mar. 2, 2006

(65) Prior Publication Data

US 2006/0222780 A1 Oct. 5, 2006

Related U.S. Application Data

(63) Continuation of application No. PCT/IB2004/051445, filed on Aug. 10, 2004.

(30) Foreign Application Priority Data

Sep. 9, 2003 (RU) ............................... 2003127822

(51) Int. Cl.
*H05H 1/24* (2006.01)
(52) U.S. Cl. .................. 427/569; 427/570; 427/596
(58) Field of Classification Search ................ 427/569, 427/570, 596
See application file for complete search history.

(56) References Cited

OTHER PUBLICATIONS

PCT Search Report (No references included in IDS).*

Kozhevin, V.M. et al. Granulated metal nanostructure deposited by laser ablation accompanied by cascade drop fission. Journal of Vacuum Science & Technology, 2000, pp. 1402-1405, vol. 18, No. 3, American Vacuum Society, USA.
Stefanovic, P. et al. Critical Parameters of Si Conversion into Si3N4 Nanophase Powder for Plasma Crocess. Materials Science Forum, 1998, pp. 57-64, vol. 282/283, Aedermannsdorf.
Yoo, K-H et al. An in-plane GaAs single-electron memory cell operating at 77 K. Applied Physics Letters, 1999, pp. 2073-2075, v. 74 (14), American Institute of Physics, USA.
Bell, G.R. et al. Nanoscale effects of arsenic kinetics on GaAs (001)-(2×4) homeopitaxy. Surface Science Letters, 1999, pp. L280-L284, v. 423, Imperial College, London, UK.
Herrig, H et al. A colloidal approach to nanometre-sized mixed oxide ceramic powders. Materials Letters, 1996, pp. 287-292, v. 27, Germany.
Golubeva, E.N. et al. Copper (II) chloride-dmf catalytic system in solution and on silica. Journal of Molecular Catalysis, 1999, pp. 343-350, v. 146, Russia.

(Continued)

*Primary Examiner*—Timothy Meeks
*Assistant Examiner*—Renee Berry
(74) *Attorney, Agent, or Firm*—Houston Eliseeva LLP

(57) ABSTRACT

The method is intended for obtaining nanosize amorphous particles, which find use in various fields of science and technology; in particular, metallic nanostructures can be regarded as a promising material for creating new sensors and electronic and optoelectronic devices and for developing new types of highly selective solid catalysts. The method for obtaining nanoparticles includes the following stages: dispersion of a molten material; supply of the resulting liquid drops of this material into a plasma with parameters satisfying the aforementioned relationships, which is formed in an inert gas at a pressure of $10^{-4}14\ 10^{-1}$ Pa; cooling of liquid nanoparticles formed in the said plasma to their hardening; and deposition of the resulting solid nanoparticles onto a support.

8 Claims, 3 Drawing Sheets

OTHER PUBLICATIONS

Khushalani, D. et al. Glycometallate surfactants. Part 1: non-aqueous synthesis of mesoporous silica. Journal of Materials Chemistry, 1999, pp. 1483-1489, v. 9, Canada.

Trakhtenberg, L.I. et al. Photo and radiation cryochemical synthesis of metal-polymer films: structure, sensor and catalytic properties. Radiation Physics and Chemistry, 2002, pp. 479-485, v. 65, Elsevier Science.

Deppert, K. et al. Self-limiting transformation of monodisperse Ga droplets into GaAs nanocrystals. Applied Physics Letters, 1996, pp. 1409-1411, v. 68(10), American Institute of Physics, USA.

Barkan, A. et al. Charging of Dust Grains in a Plasma. Physical Review Letters, Dec. 5, 1994, pp. 3093-3096, v. 73, No. 23, The American Physical Society, USA.

Grigor'Ev, A.I. et al. Rayleigh decay of a charged drop. Gases and Liquids, Mar. 1991, pp. 258-263, v. 36(3), American Institute of Physics, USA.

Pikus, F.G. et al. Nanoscale field-effect transistors: An ultimate size analysis. Applied Physics Letters, Dec. 1997, pp. 3661-3663, v. 71(25), American Institute of Physics, USA.

Naveh, Y. et al. Shrinking limits of silicon MOSFETs: numerical study of 10 nm scale devices. Superlattices and Microstructures, 2000, v. 27, No. 2/3, Academic Press, USA.

Tohno, Susumu et al. Production of contact-free nanoparticles by aerosol process: dependence of particle size on gas pressure. Journal of Colloid and Interface Science, 1996, pp. 574-577, v. 180, Academic Press, Inc., USA.

* cited by examiner

METHOD FOR OBTAINING NANOPARTICLES

RELATED APPLICATIONS

This application is a Continuation of PCT application serial number PCT/IB2004/051445 filed on Aug. 10, 2004 which in turn claims priority to Russian application serial number RU2003127822 filed on Sep. 9, 2003, both of which are incorporated by reference herein in their entirety.

FIELD OF THE INVENTION

The invention is intended for obtaining nanosize particles that find application in various fields of science and technology; in particular, metallic nanostructures are regarded as a promising material for development of new sensors and electronic and optoelectronic devices and for design of new types of highly selective solid-state catalysts.

BACKGROUND OF THE INVENTION

As shown in a number of recent publications, nanostructures with a surface particle density on the order of $10^{12}$ cm$^{-2}$ are promising for development of efficient nanoelectronic devices, such as ultrafast switches or subminiature memory cells (K. -H. Yoo, J. W. Park, J. Kim, K. S. Park, J. J. Lee and J. B. Choi. *Appl. Phys. Lett.*, 1999, v. 74 (14), p. 2073).

For example, in the case of densely packed nanostructures with grain size of ~4 nm, it is possible to create storage devices with recording density of ~$10^{11}$ bit/cm$^2$ (F. Pikus and K. Likharev. *Appl. Phys. Lett.*, 1997, v. 71, p. 3661; Y. Naveh and K. Likharev. *Superlattices and Microstructures* 2000, v. 27, p. 1). In the limiting case of grain size diminished to ~1 nm, the recording density increases to $10^{12}$ bit/cm$^2$.

In the last decade, a new area of catalytic chemistry has formed and is rapidly developing now: heterogeneous catalysis on nanostructured materials (P. S. Vorontsov, E. I. Grigor'ev, S. A. Zav'yalov, L. M. Zav'yalova, T. N. Rostovschikova, O. V. Zagorskaya, *Himicheskaya Physica* 2002, v. 21, p. 1). Most of the catalysts that are studied in laboratories and used in technological practice contain nanoparticles, i.e., particles with dimensions in the range 1–100 nm. The fundamental distinction between nanoparticles and bulk materials is that the fraction of surface atoms in nanoparticles is comparable with that in the bulk and the radius of curvature of the surface is comparable with the lattice constant. It is a commonly accepted opinion that it is these specific features that ensure the high catalytic activity of nanostructured catalysts as compared with their analogues based on bulk materials. The most promising for quite a number of practically important applications are catalysts based on metallic nanostructures, which contain nanoparticles of Cu, Pt, Pd, Ni, Fe, Co, and other metals.

The known methods for obtaining nanoparticles of various materials can be divided into two large groups: in the first of these, nanoparticles are formed by combination of atoms (or more complex radicals and molecules), and in the second, by dispersion of bulk materials.

Numerous methods based on combination of atoms (radicals, molecules) into nanoparticles are known, including, e.g., thermal evaporation and condensation (see S. Tohno, M. Itoh, S. Aono, H. Takano, *J. Colloid Interface Sci.*, 1996, v. 180, p. 574), ion sputtering (see U.S. Pat. No. 5,879,827, Int. Cl. H 01 M 04/36, published Sept. 03, 1999), reduction from solutions (see U.S. Pat. No. 6,090,858; Int. Cl. C 09 K 03/00, published 18 Jul. 2000), and reduction in microemulsions (see H. Herrig, R. Hempelmann, *Mater. Lett.*, 1996, v. 27, p. 287).

For example, in the method for obtaining nanoparticles by reduction of metals from solutions, an aqueous solution of a metal salt and an anion-active compound with COO$^-$, SO$_4^{2-}$, or SO$_3^{2-}$ groups as a reducing agent is heated to 50–140° C., with the result that the metal salt is reduced to give metallic nanoparticles (see U.S. Patent Application Ser. No. 20020194958; Int. Cl. B 22 F 09/24, published 26 Dec. 2002).

In the known method for deposition of submonolayer and monolayer coatings composed of gold and silver nanoparticles, the structure is formed via capture of metallic nanoparticles prepared in a colloid solution onto the support surface covered by a special organic film (see U.S. Pat. No. 6,090,858; Int. Cl. C 09 K 03/00, published 18 Jul. 2000).

The advantage of this method consists in that it enables immobilization on the support surface of spherical nanoparticles with average size in the range from 3 to 100 nm (depending on preparation conditions) with rather narrow size dispersion. However, the maximum surface density of particles on the support surface does not exceed in this case 0.5 d$^2$ (where d is the average size of nanoparticles). Accordingly, exchange of electrons between neighboring particles is hardly probable and it is impossible to use structures of this kind to create catalysts operating in the maximum efficiency mode and to design efficient nanoelectronic devices in which the effects of interaction and charging of densely packed particles are important.

A method is known for obtaining silicon clusters in structural voids of zeolites, which consists in introduction of disilane (Si$_2$H$_6$) into these voids and its subsequent oxidation. Silicon liberated in the reaction assembles into nanoclusters. This technique is a particular case of the chemical vapor deposition (CVD) method (see Dad O., Kuperman A., MacDonald P. M., Ozin G. A.—A New Form of Luminescent Silicon—Synthesis of Silicon Nanoclusters in Zeolite-Y.—Zeolites and Related Microporous Materials: State of the Art., 1994, v. 84, p.p. 1107–1114). The method cannot be used to form silicon nanostructures in local regions because it transforms the zeolite substrate across virtually its whole thickness. An, in fact, homogeneous composite material is produced by this known technique.

Also known is a method of cryochemical synthesis of metal-polymer nanostructures (see L. I. Trakhtenbers et al., Zh. Fiz. Khim., 2000, vol. 74, p. 952).

The main advantage of metal-polymer nanostructures is their rather high specific activity as catalysts. However, as the content of metal increases, the catalytic activity of catalysts of this kind decreases because crystalline nanoparticles formed by this technique coagulate when coming in contact with one another. Moreover, the fundamental aspects of nanoparticle growth, inherent in the cryochemical synthesis, necessarily lead to a broad distribution of particle sizes and shapes.

To methods of the second group (formation of nanoparticles by dispersion of materials) should be referred the technique (see K. Deppert and L. Samuelson. *Appl. Phys. Lett.*—1996, v. 68(10), p. 1409) in which the initial flow of polydisperse liquid drops is produced in the course of thermal evaporation of an overheated material, capture of drops by the flow of an inert carrier gas (nitrogen), and, further, successive separation of particles via interaction of charged particles in the gas flow with the electric field in the differential mobility analyzer. The thus formed flux of charged nanoparticles is deposited onto the substrate. This method, named "Aero taxi" by its authors, makes it possible to obtain a monodisperse flux of charged nanosize particles of metals (and semiconductors). The method yields 20–30-nm crystalline particles, with the particle size dispersion not less than 50% (the size scatter directly depends on the number of separation stages). Among disadvantages of the method are its low output capacity and relatively wide particle size dispersion. Moreover, the method gives no way of forming metallic particles with high density of particle packing, because, as the density increases, crystalline nanoparticles coagulate into more bulky formations.

The method for obtaining nanoparticles, which is the closest to that claimed in this patent application and is chosen as the prototype, was described in (V. M. Kozhevin, D. A Yavsin, V. M. Kouznetsov, V. M. Busov, V. M. Mikushkin, S. Yu. Nikonov, S. A. Gurevich, and A. Kolobov, *J. Vac. Sci. Techn.* B, 2000, v. 18, no. 3, p. 1402). This method is based on ablation of a metallic target under the action of light generated by a high-power pulse-periodic laser. Rather severe modes of target irradiation are chosen, in which, together with evaporation of the target, a great number of micrometer- and submicrometer-size drops of molten metal are ejected from its surface. Optical breakdown of a vapor near the target surface leads to the formation of a hot laser torch plasma, while the temperature and density of this plasma are determined by the type of a metal and conditions of target irradiation (power density of the incident laser light, angle of incidence, etc.). In the laser torch plasma, liquid metal drops ejected from the target surface are charged to a critical value, to the threshold of capillary instability, on reaching which drops start to break down to produce a multitude of finer (daughter) drops. The daughter drops are charged to above the instability threshold, so that the breakdown process that has started is of a cascade nature. However, it was shown in the publication mentioned above that the process of drop breakdown continues only to a certain extent. This process terminates because, as the size of charged drops steadily decreases, the current of autoelectronic emission from their surface grows, which, in the end, leads to a decrease in the drop charge to below the instability threshold. For most of metals, the size of drops formed by the end of the breakdown process is on the order of several nanometers. The abrupt termination of the process ensures a sufficiently narrow size distribution of the resulting nanoparticles. Thus, the breakdown of liquid micrometer- and submicrometer-size metal drops in the laser torch plasma yields a great number of nanometer-size particles with a narrow size distribution.

The prototype method described has been used to deposit onto the substrate surface single-layer coatings composed of 8–10 nm copper nanoparticles. Even though the particle size dispersion was not evaluated for the prototype method, it may be concluded, on the basis of the results obtained in this study, that the size distribution is much narrower than, e.g., that for the "Aero taxi" method.

However, the conditions that could ensure stable formation of nanoparticles with amorphous structure have not been determined for the prototype method. This circumstance markedly restricts the possibility of reproducible formation of nanostructures with high surface density of particles on the support surface, which is very important, e.g., for carrying out effective catalysis and developing a number of nanoelectronic devices. This also hinders the industrial application of the prototype method.

It should also be noted that, as established by the authors, the range of plasma parameters in which an effective breakdown of liquid charged drops can be achieved is considerably wider. This makes it possible to produce nanoparticles not only in a laser-induced plasma, but also in a plasma formed by other, more technologically convenient methods yielding a quasi-stationary plasma.

In the known method for obtaining nanoparticles, the conditions are close to equilibrium, which leads to the formation of metallic particles that are, as a rule, in the crystalline state. The coalescence of crystalline nanoparticles gives rise to severe difficulties in formation of structures with a high density of particle packing.

SUMMARY OF THE INVENTION

The aim of the claimed invention is to modify the known prototype method by developing such a procedure for obtaining nanoparticles that could be used to deposit onto the surface of a support nanoparticles with a narrow size dispersion and amorphous structure, which makes it possible to achieve an exceedingly high density of nanoparticle packing. The improvement of the known prototype method also includes raising the efficiency of conversion of the starting material into nanoparticles.

The formulated problem can be solved by using the following procedure to obtain nanoparticles. This procedure includes dispersion of a molten material, supply of the resulting liquid drops of this material into a plasma formed in an inert gas at a pressure of $10^{-4}$–$10^{-1}$ Pa, cooling of liquid nanoparticles formed in the said plasma to their solidification, and deposition of the resulting solid nanoparticles onto a support, with the plasma parameters satisfying the following relations $$T_e > 1.4 \cdot 10^5 \frac{\sqrt{R_D R (R_D + R)}}{R_D + 2R} \quad (1)$$

$$n_e^{1/2} > 9\tau_d^{-1}\left(1 + \frac{R_D}{r}\right) \quad (2)$$

$$\frac{1}{\tau_p} + \frac{10^3}{L} > 10^{-5} T_m^3 \quad (3)$$

where R and r are, respectively, the maximum and minimum radii of liquid drops fed into the plasma, m;\

$$R_D = 7.5 \cdot 10^3 \sqrt{\frac{T_e}{n_e}}$$

is the Debye screening length, m;

$T_e$ is the electron temperature of the plasma, eV;

$n_e$ is the density of the plasma, $m^{-3}$;

$\tau_d$ is the time of transit of liquid drops across the plasma zone, s;

$\tau_p$ is the lifetime of plasma, s;

$T_m$ is the melting point of the conducting material, K;

L is the characteristic distance along which the plasma pressure decreases by a factor of e, m.

As a material that can be used to obtain nanoparticles can serve a metal, a semiconductor, or a metal oxide.

The nanoparticles obtained can be deposited onto a support in an electric field whose strength vector makes a certain angle with the direction of nanoparticle motion, e.g., in a nonuniform electric field.

The molten material can be dispersed, and the resulting liquid drops fed into the said plasma, by laser ablation of a target made of the said material in the atmosphere of an inert gas with a pressure of $10^{-4}$–$10^{-2}$ Pa under the action of light generated by a pulsed-periodic YAG:Nd$^{3+}$ laser operating at a wavelength of 1.06 µm at a pulse length of no less than 20 ns, pulse leading front of less than 5 ns, and pulse repetition frequency of no less than 10 Hz. The power density of laser light incident on the target should be not less than $10^9$ W/cm$^3$. The molten material can also be dispersed by applying to a pointed cathode with tip radius not exceeding 10 µm, made of a conducting material, an electric field with strength at the cathode tip apex of no less than $10^7$ V/cm. The resulting liquid drops can be fed into a plasma formed in an electric discharge with pulse duration of no less than 10 µs, created in an inert gas at a pressure of $10^{-3}$–$10^{-1}$ Pa between electrodes at a potential difference of no less than 2 kV and simultaneous action of a magnetic field with a strength of no less than 600 G, directed perpendicularly to the said electric field creating the said plasma.

The essence of the invention consists in that, in contrast to the known prototype method, the parameters of the plasma used are chosen to meet the requirement that conditions (1)–(3) should be satisfied simultaneously. These conditions ensure a cascade fission of all the initial liquid drops of the material, injected into the plasma, and a fast cooling of the forming liquid nanometer-size drops (final products of drop fission), such that the solid nanoparticles deposited onto the substrate have an amorphous structure. If these conditions are satisfied, monodispersive structures composed of amorphous nanoparticles with variable (including an exceedingly high) packing density can be reproducibly formed, with an efficient conversion of the starting material into nanoparticles.

When practicing the claimed method, the density and electron temperature of plasma are chosen on the basis of the condition (1). In deriving this condition, which assumes that the initial drops are charged to Rayleigh's capillary instability threshold (A. I. Grigor'ev, S. O. Shiryaeva, *Journal of Technical Physics*, 1991, v. 61 (3), p. 258), the charge of drops was calculated using the known dependence of the floating potential of the drops on plasma parameters (Yu. P. Raizer, Physics of Gas Discharge, Moscow: Nauka, 1987). It is noteworthy that the capillary instability threshold was formulated in the prototype method only for a drop with a certain radius R. However, the initial liquid drops injected into the plasma are actually always characterized by a certain size distribution, in which the maximum (R) and minimum (r) drop sizes can be distinguished. For all the initial drops with sizes in the range from R to r to be charged to the instability threshold and to be involved in the process of cascade fission, the parameters of the plasma should be chosen with account of condition (1). When this condition is not satisfied, only part of the initial drops will undergo division to a nanometer size and, thereby, the efficiency of nanoparticle formation will be markedly impaired.

It is also important that expression (1) is valid only in the case when the initial liquid drops remain in the plasma for a sufficiently long time, during which their stationary charge state is attained. The stationary state is attained if condition (2), which means that the time of drops transit across the volume occupied by the plasma exceeds the time in which they are charged to the floating potential, is satisfied. If this is not the case, the initial drops will have not enough time to be charged during their residence in the plasma and their division will not occur. Thus, the fact that condition (1) is supplemented with condition (2) is a significant difference from the prototype method, which ensures that all the initial drops of the material, fed into the plasma zone, are involved in the fission process.

For the nanoparticles to be formed in the amorphous state, it is necessary to ensure their cooling at the instant of hardening at a rate of no less than $10^7$ K/s. Calculation of the rate of nanoparticle cooling via radiation loss shows that the required cooling rate is obtained at a particle size of less than 10 nm. Accordingly, the condition of a fast cooling of nanoparticles is satisfied when the radiation loss is not compensated for by the inflow of energy from the plasma. There are two ways to meet this requirement. In the first case of a nonstationary plasma, it is necessary that, after the process of drop fission is complete, the plasma should rapidly expand and cool down, with the time of its cooling being shorter than the time of cooling of nanoparticles to the melting point. In the second case of a quasi-stationary plasma, it is necessary that nanoparticles formed in drops fission process should pass the plasma boundary region, where the pressure of the plasma decreases to the pressure of the inert gas, sufficiently rapidly, i.e., in a time shorter than the time necessary for cooling of nanoparticles to the melting point. The condition under which these requirements are satisfied is given by expression (3).

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. The claimed method for obtaining nanoparticles is illustrated by the drawings in which:

DETAILED DESCRIPTION OF THE PREFERRED EMBODIMENTS

Figure 1:
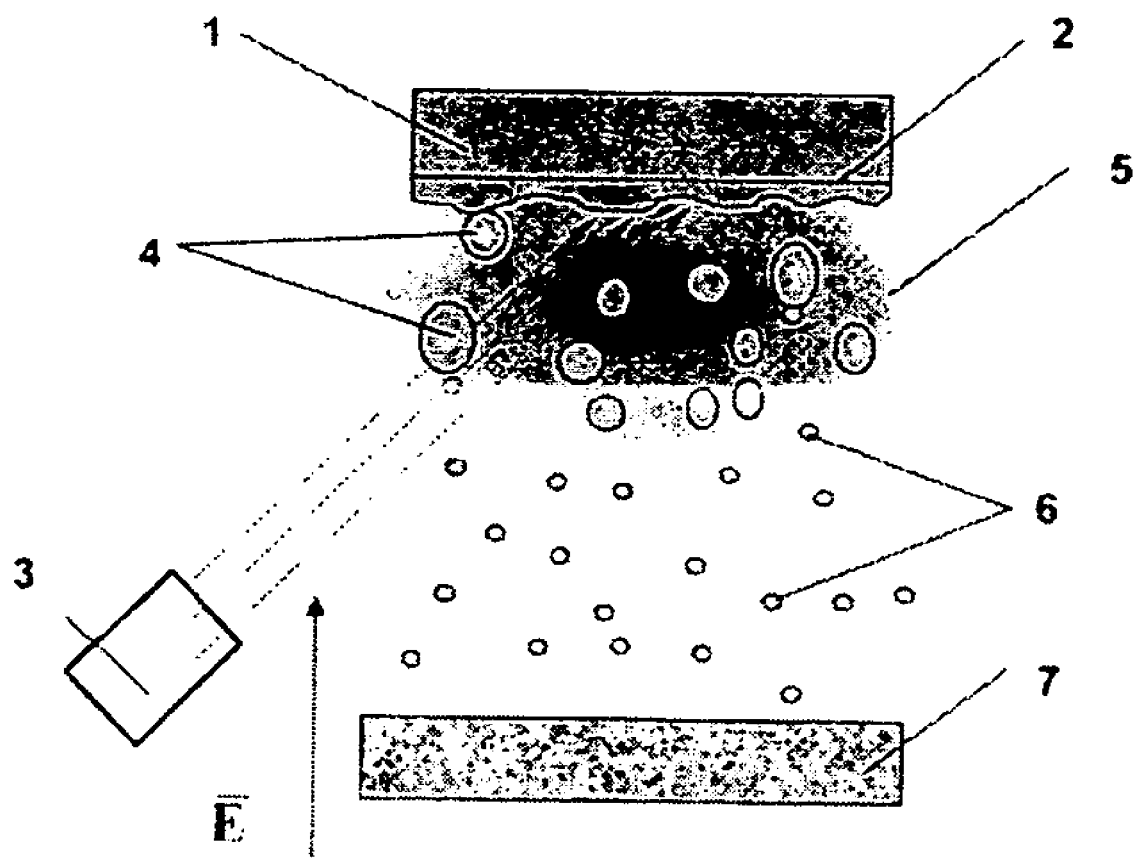
FIG. 1 shows schematically how nanoparticles can be obtained by means of laser dispersion (E is the electric field strength vector)

The schematic of the process for obtaining nanoparticles by laser dispersion (FIG. 1), used in practicing the claimed method, includes a target 1, whose molten surface layer 2 is dispersed under the action of a pulsed-periodic laser 3 to give liquid drops 4, which, when passing the plasma zone 5, undergo division to nanoparticles 6. The resulting nanoparticles 6 are deposited onto a substrate 7. The process is performed in an atmosphere of argon at a pressure of $10^{-4}$–$10^{-2}$ Pa.

The installation for plasma-assisted electrodispersion, in which a stationary plasma is formed, includes (see FIG. 4) a vacuum chamber 8 in which a pointed cathode 9, an anode with an aperture 11, a cathode 12 with an opening 13, and an annular anode 14 on which substrates 7 are mounted. The chamber is filled with an inert gas at a pressure of $10^{-3}$–$10^{-1}$ Pa. When an appropriate potential difference is created between the pointed cathode 9 and anode 10, molten drops 4 emerge from the surface of the cathode 9. When these drops pass the plasma zone 5, they are divided to form nanoparticles 6 and coarser (than the nanoparticles) drops 15.

The claimed method for obtaining nanoparticles is practiced as follows. A molten material, from which nanoparticles are to be produced, is dispersed by any known method (e.g., by atomization with a nozzle). The resulting liquid drops are fed into a plasma formed in an inert gas at a pressure of $10^{-4}$–$10^{-1}$ Pa. As inert gas can serve any known inert gas. The liquid nanoparticles formed in the plasma zone are cooled in the inert gas to hardening and then the resulting solid nanoparticles are deposited onto a support made of any solid material. As established by the authors, the plasma parameters should satisfy the relations:

$$T_e > 1.4 \cdot 10^5 \frac{\sqrt{R_D R (R_D + R)}}{R_D + 2R} \quad (1)$$

$$n_e^{1/2} > 9\tau_d^{-1}\left(1 + \frac{R_D}{r}\right) \quad (2)$$

$$\frac{1}{\tau_p} + \frac{10^3}{L} > 10^{-5} T_m^3 \quad (3)$$

where R and r are, respectively, the maximum and minimum radii of liquid drops fed into the plasma, m;

$$R_D = 7.5 \cdot 10^3 \sqrt{\frac{T_e}{n_e}}$$

is the Debye screening length, m;

$T_e$ is the electron temperature of the plasma, eV;

$n_e$ is the density of the plasma, m$^{-3}$;

$\tau_d$ is the time of transit of liquid drops across the plasma zone, s;

$\tau_p$ is the lifetime of plasma, s;

$T_m$ is the melting point of the conducting material, K;

L is the characteristic distance along which the plasma pressure decreases by a factor of e, m.

As a material that can be used to obtain nanoparticles can serve both a metal and a semiconductor or a metal oxide.

It is advisable to deposit the nanoparticles obtained onto a support in an electric field whose strength vector makes a certain angle with the direction of nanoparticle motion, e.g., in a nonuniform electric field.

EXAMPLE 1

The claimed method for obtaining nanoparticles was practiced on the basis of laser dispersion of such metals as copper and nickel (see FIG. 1). In this case, irradiation of the surface of the metallic target 1 with a pulsed-periodic laser 3 leads to melting of the surface layer 2 of the target 1 and the material of the target 1 evaporates. As a result of an optical breakdown of the vapor formed, a plasma zone 5 with a thickness L≦100 μm is formed near the surface of the molten layer 2 of the target 1. Under the action of plasma 5, the molten surface layer 2 becomes unstable, which leads to dispersion of the metal to give liquid particles 4 from the metal of the target 1, with the maximum and minimum radii of these particles being R=1 μm and r=100 nm, respectively. Liquid drops 4 formed as a result of dispersion are fed into the plasma zone 5, which is heated by absorbed laser light. In the plasma zone 5, drops 4 are charged to the floating potential, so that their charge is mainly determined by the temperature of electrons in plasma 5. If the amount of charge is such that Coulomb repulsion forces exceed the surface tension force, then the drop 4 becomes unstable (capillary instability) and starts to break down into smaller drops 6.

The capillary instability develops if condition (1) is satisfied. This condition elates the electron temperature ($T_e$), the density of electrons in the plasma ($n_e$), and the maximum radius of particles 4 fed into the plasma zone 5 (R). In order for dispersed particles 4 to have enough time to obtain a charge sufficient for their transition to an unstable state, condition (2) should be satisfied. These conditions impose restrictions on the minimum electron temperature and density of plasma 5. For particles 4 with sizes R=1 μm and r=100 nm, the required temperature of electrons is ~30 eV, and the density of plasma 5, $n_e=10^{18}$ cm−3. The necessary parameters can be obtained if the power density of laser light incident on the target exceeds $10^9$ W/cm$^2$ and the laser pulse has such a shape that the pulse-rise time is less than 5 ns and the full pulse width exceeds 20 ns.

If conditions (1) and (2) are satisfied, this ensures that all liquid drops 4 fed into the plasma zone 5 undergo division: the process occurs in the form of a cascade with successive formation of increasingly fine drops and culminates in the formation of a great number of nanosize liquid drops 6. Depending on the ratio between the plasma expantion velocity of 6 and the motion velocity of nanoparticles 6, liquid nanoparticles 6 can either leave the region of hot plasma 5 and eventually undergo cooling and hardening, or cool down and harden because of the expansion of the plasma cloud. For nanoparticles to have an amorphous structure in the solid state, it is necessary to ensure a sufficiently high (~$10^7$ K/s) rate of their cooling in hardening. Such a cooling rate is ensured by radiation loss if nanoparticles 6 are outside the plasma zone 5 at the instant of hardening, i.e., if inequality (3) is satisfied. Under the conditions of the experiment described, the plasma lifetime $\tau_p$=1 μs, L≦100 μm. If copper or nickel is chosen as the material of the target 1, the motion velocity of nanoparticles 6, $v_n$=3 $10^4$ cm/s, and the melting point falls within the range $T_m$=1350–1730 K. In this case, condition (3) is satisfied.

Figure 2:
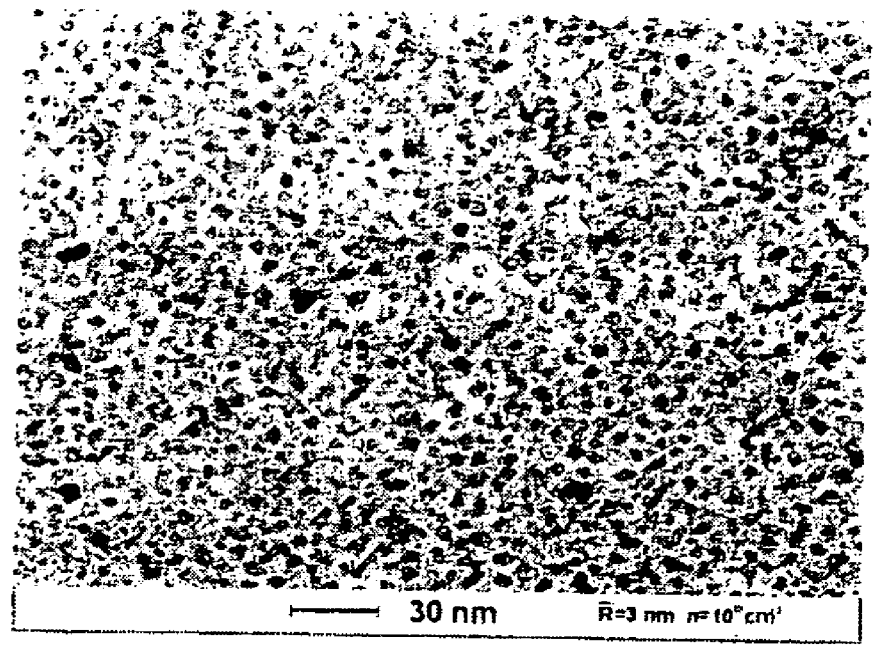
FIG. 2 shows a TEM image of a structure constituted by a substrate and copper nanoparticles deposited on it.
Figure 3:
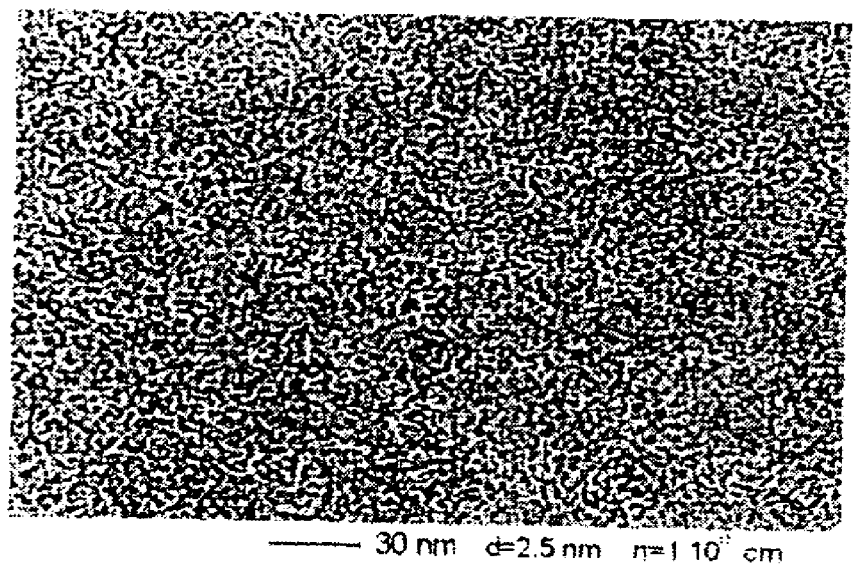
FIG. 3 shows a TEM image of a structure constituted by a substrate and nickel nanoparticles deposited on it.

With the above-described parameters of the process, copper and nickel nanoparticles 6 were obtained (FIGS. 2 and 3). Both copper and nickel nanoparticles 6 were in the amorphous state.

Particles 6 were deposited onto oxidized silicon substrates 7. The size of the particles 6 was 5 nm for copper and 2.5 nm for nickel. The relative variance of the sizes of nanoparticles 6, evaluated using TEM images, did not exceed 20%. In contrast to nanoparticles obtained using the prototype method, in which nanoparticles are crystalline and coagulate when coming in contact with one another, the size of the nanoparticles 6 produced by the claimed method was found to be twice smaller. This is due to the choice of the rise time of the laser light pulse, which ensures that condition (2) is satisfied.

EXAMPLE 2

Figure 4:
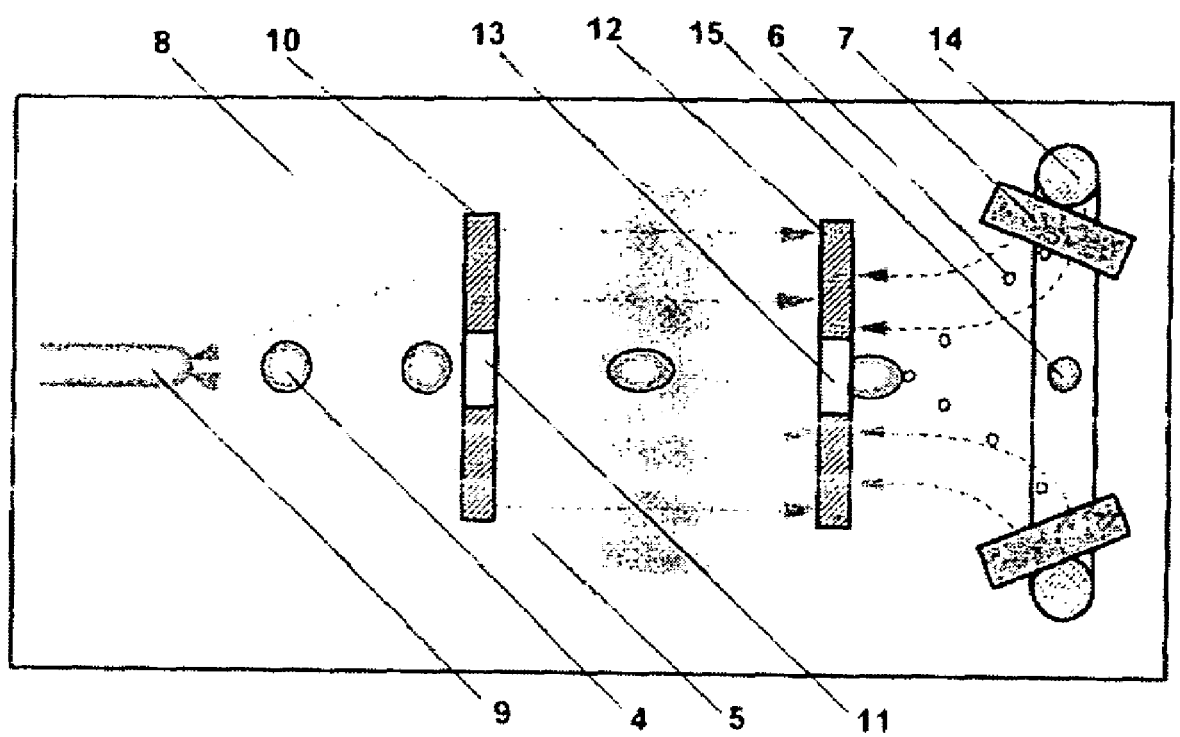
FIG. 4 shows schematically the installation for plasma-assisted electrodispersion, in which the claimed method for obtaining nanoparticles is realized.

The claimed method was practiced on the basis of an installation for plasma-assisted electrodispersion, which is shown schematically in FIG. 4. Molten metal was dispersed by applying to a metallic pointed cathode 9 with a radius of tip curvature not exceeding 10 μm an electric field with a strength at the tip apex of no less than $10^7$ V/s.

Molten drops 4 obtained at the tip 8 are delivered to the plasma zone 5 created by a stationary or quasi-stationary discharge in an inert gas at a pressure of $10^{-3}$–$10^{-1}$ Pa, to be charged there. The electron density in stationary discharges at these pressures is on the order of $n_e = 10^{10}$–$10^{11}$ cm$^{-3}$, and, in accordance with condition (1), the required temperature of electrons should exceed 500 eV. To create such a temperature, the potential difference between anode 9 and cathode 10 was set to be no less than 2 kV.

For drops 4 not to have enough time to be charged to the floating potential, i.e., for condition (2) to be satisfied at a given electron density, the anode 9 and the cathode 10 are to be mounted at a certain distance from each other, in accordance with the chosen inert gas pressure (about 5 cm).

If the above conditions are satisfied, drops 4 flying into the plasma zone 5 become unstable, which leads to the onset of their cascade fission.

The lifetime of stationary or quasi-stationary plasma 5 is long, and, in contrast to the case of laser dispersion, whether or not the inequality that describes condition (3) is satisfied is determined by the choice of parameter L. In the given case, the value of this parameter is close to the size of the opening in the cathode 10 and, in view of the requirements imposed by condition (3), it should not exceed 1 cm.

Further, the forming nanosize drops 6 were separated from coarser drops 11 by choosing the dimensions of the annular anode 12, on which substrates 1 are mounted. The potential difference between the anode 12 and the cathode 10 was chosen in such a way that nanosize particles 6 were directed by the electric field to the substrate 1, and the trajectories of coarse particles 11 were not distorted. The resulting nanoparticles 6 were also in the amorphous state.

Thus, the claimed method yields nanosize spherical amorphous particles with a narrow size dispersion.

While this invention has been particularly shown and described with references to preferred embodiments thereof, it will be understood by those skilled in the art that various changes in form and details may be made therein without departing from the scope of the invention encompassed by the appended claims.

What is claimed is:

1. The method for obtaining nanoparticles, comprising:
   dispersing a molten material to obtain liquid drops;
   supplying the resulting liquid drops of the material into a plasma formed in an inert gas at a pressure of $10^{-4}$–$10^{-1}$ Pa to form liquid nanoparticles;
   cooling of the liquid nanoparticles formed in the plasma to form solid nanoparticles; and
   depositing of the resulting solid nanoparticles onto a support;
   wherein the plasma parameters are satisfying the relations $$T_e > 1.4 \cdot 10^5 \frac{\sqrt{R_D R (R_D + R)}}{R_D + 2R} \quad (1)$$

$$n_e^{1/2} > 9 \tau_d^{-1} \left(1 + \frac{R_D}{r}\right) \quad (2)$$

-continued $$\frac{1}{\tau_p} + \frac{10^3}{L} > 10^{-5} T_m^3 \quad (3)$$

where R and r are, respectively, the maximum and minimum radii of the liquid drops supplied into the plasma, m;

$$R_D = 7.5 \cdot 10^3 \sqrt{\frac{T_e}{n_e}}$$

is the Debye screening length, m;
$T_e$ is the electron temperature of the plasma, eV;
$n_e$ is the density of the plasma, m$^{-3}$;
$\tau_d$ is the time of transit of the liquid drops across a plasma zone, s;
$\tau_p$ is the lifetime of the plasma, s;
$T_m$ is the melting point of a conducting material, K;
L is the characteristic distance along which the plasma pressure decreases by a factor of e, m.

2. The method of claim 1, wherein a metal is used as the material.

3. The method of claim 1, wherein a semiconductor is used as the material.

4. The method of claim 1, wherein a metal oxide is used as the material.

5. The method of claim 1, wherein the nanoparticles are deposited onto the support in an electric field whose strength vector makes a certain angle with the direction of nanoparticle motion.

6. The method of claim 1, wherein the nanoparticles are deposited onto the support in a nonuniform electric field.

7. The method of claim 1, wherein the molten material is dispersed, and the resulting liquid drops are supplied into the plasma by means of laser ablation of a target made of the material in the atmosphere of an inert gas with a pressure of $10^{-4}$–$10^{-2}$ Pa under the action of light generated by a pulsed-periodic YAG:Nd$^{3+}$ laser operating at a wavelength of 1.06 μm at a pulse duration of no less than 20 ns, a pulse leading front of less than 5 ns, and a pulse repetition frequency of no less than 10 Hz, with a power density of the laser light incident on the target set to be no less than $10^9$ W/cm$^3$.

8. The method of claim 1, wherein the molten material is dispersed by applying to a pointed cathode having a tip radius not exceeding 10 μm and made of a conducting material, an electric field having a strength at the tip apex of no less than $10^7$ V/cm, and the resulting liquid drops are supplied into the plasma formed in an electric discharge with a pulse duration of no less than 10 μs, created in an inert gas at a pressure of $10^{-3}$–$10^{-1}$ Pa between electrodes at a potential difference of no less than 2 kV and a simultaneous action of a magnetic field with a strength of no less than 600 G, directed perpendicularly to the electric field creating the plasma.

* * * * *